(12) United States Patent
Sanford

(10) Patent No.: US 6,628,225 B2
(45) Date of Patent: Sep. 30, 2003

(54) REDUCED SPLIT TARGET REPLY PROCESSOR FOR SECONDARY SURVEILLANCE RADARS AND IDENTIFICATION FRIEND OR FOE SYSTEMS

(75) Inventor: Norman Ray Sanford, Cockeysville, MD (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/152,512

(22) Filed: May 21, 2002

(65) Prior Publication Data

US 2003/0102996 A1 Jun. 5, 2003

Related U.S. Application Data

(60) Provisional application No. 60/334,733, filed on Nov. 30, 2001.

(51) Int. Cl.$^7$ .............................................. G01S 13/74
(52) U.S. Cl. ............................. 342/32; 342/29; 342/36; 342/37
(58) Field of Search ......................... 342/29–32, 36–40, 342/63

(56) References Cited

U.S. PATENT DOCUMENTS

| 4,899,157 | A | | 2/1990 | Sanford et al. | |
|---|---|---|---|---|---|
| 4,945,550 | A | | 7/1990 | Krause et al. | |
| 5,001,751 | A | | 3/1991 | Sanford et al. | |
| 5,063,386 | A | * | 11/1991 | Bourdeau et al. | 342/40 |
| 5,321,406 | A | * | 6/1994 | Bishop et al. | 342/32 |
| 5,387,915 | A | * | 2/1995 | Moussa et al. | 342/40 |
| 2002/0180631 | A1 | * | 12/2002 | Alon | 342/37 |

* cited by examiner

Primary Examiner—Thomas H. Tarcza
Assistant Examiner—Isam Alsomiri
(74) Attorney, Agent, or Firm—Renner, Otto, Boisselle & Sklar

(57) ABSTRACT

A method of processing reply signals received in response to an interrogation by a secondary surveillance radar system. The method includes the steps of receiving a reply signal from each of a plurality of targets, and enabling each of a plurality of target mode blocks having a predefined mode to select from the reply signals. The method further includes the step of correlating the selected reply signal to the target mode block that selected same.

21 Claims, 8 Drawing Sheets

REDUCED SPLIT TARGET REPLY PROCESSOR FOR SECONDARY SURVEILLANCE RADARS AND IDENTIFICATION FRIEND OR FOE SYSTEMS

This application claims the benefit of U.S. Provisional Application No. 60/334,733 filed Nov. 30, 2001.

TECHNICAL FIELD

The present invention relates generally to a processor for processing replies received by a secondary surveillance radar system. More particularly, the present invention relates to a processor that employs a processing method designed to reduce the occurrence of multiple target reports from a single physical target.

BACKGROUND OF THE INVENTION

Secondary Surveillance Radars (SSR) presently in use employ interrogator transmitters, which query transponders aboard civilian and military aircraft, civilian and military ships, and other ground, airborne or sea based platforms. For purposes of this discussion, we will refer to an aircraft as the transponder platform. The interrogators are generally associated with a reply receiver, quantizer, reply decoder, and reply processor that together process replies received from the transponders aboard the aforementioned aircraft. These replies contain information that among other things convey the identity of the aircraft, the altitude of the aircraft and other information. The transponder information transmitted is based upon the interrogation mode the SSR employs at a given time.

The reply processor operates to create what are known as target reports. Target reports are then used "downstream" for further processing such as by trackers, displays, or other data reduction devices. Unfortunately, at times, processing a set of returned replies from a single target can result in the creation and output of multiple target reports associated with the single target. These multiple target reports associated with a single target result in post-processing errors by the trackers, displays, and other data reduction devices. For example, in the case of a display, if two target reports are generated for the same target, then the display visually indicates the presence of two targets or objects in the same spatial area. As one can appreciate, two objects appearing in the same spatial area can be problematic, particularly in the area of air traffic control. The creation of multiple target reports for a single object target is exacerbated when two or more interrogation modes (to be discussed in more detail below) are interlaced within a single scan of the interrogator, an approach that is fairly common.

Prior attempts to solve the creation of multiple target reports have had limited success. Solutions have included post-processing the target reports prior to use by the trackers, displays or other data reduction devices in an effort to identify occurrences of multiple target reports. For example, attempts have been made to process the target reports created by the interrogator in order to eliminate or ignore one or more of the multiple target reports. Although somewhat effective, this post-processing of target reports suffers from drawbacks. For example, the post-processing can be time consuming, which can impact negatively the performance in time critical situations of the SSR. Additionally, the quality of the reports that are passed to the tracker, display or other data reduction device may be degraded as a result of the post-processing of the target reports.

Other solutions to this problem have focused on the correlation and association of the reply data the SSR receives from the transponder that is performed within the interrogator. Attempts have been made to correlate and associate replies from multiple modes during an integrated target report building process. In other words, the interrogator attempts to correlate and associate the received reply data to a target regardless of the interrogator mode to which the transponder sent the data in reply. This integrated target report building process can result in situations where the reply data for one mode is correctly correlated and associated to the target but the reply data in a second mode is incorrectly correlated and associated to that same target.

Therefore, it would be advantageous to have a Secondary Surveillance Radar system that minimized the occurrence of multiple target reports for a single target. In particular, it would be advantageous to have a Secondary Surveillance Radar system that did not require post-processing of created target reports before the target reports are provided to trackers, displays, or other data reduction devices. It would also be advantageous to have a Secondary Surveillance Radar system that distinguished between reply data received from a single target in response to different interrogation modes utilized by the interrogator of the system.

SUMMARY OF THE INVENTION

In accordance with one aspect of the present invention is provided a method of processing reply signals received in response to an interrogation by a secondary surveillance radar system. The method includes the steps of receiving a reply signal from each of a plurality of targets, and enabling each of a plurality of existing target mode blocks having a predefined mode to select from the reply signals. The method further includes the step of correlating the selected reply signal to the target mode block that selected same.

In accordance with another aspect of the present invention is provided a method of processing reply signals received in response to an interrogation by a secondary surveillance radar system that includes the step of receiving a reply signal from each of a plurality of targets. The method further includes the steps of correlating the reply signals to one of a plurality of existing target mode blocks, selecting the existing target mode blocks that satisfy a predetermined mode declaration criteria, and identifying the selected existing target mode blocks to be used to build a plurality of target reports.

In accordance with still a further aspect of the present invention is provided a secondary surveillance radar system for sending a plurality of interrogations and receiving a plurality of reply signals in response thereto. The system includes a transmitter for sending the interrogations, and a receiver having an output for receiving the reply signals. The system further includes a processor operatively coupled to the output for processing the reply signals. The processor has a memory for storing a plurality of existing target mode blocks, and a first correlator for selectively correlating the reply signals to one of the plurality of existing target mode blocks. In addition, the processor has a means for establishing a dynamic predetermined mode declaration criteria, and a second correlator for selectively correlating the target mode blocks that satisfy the predetermined mode declaration criteria to one of a plurality of existing target reports.

In accordance with still another aspect of the present invention is provided a secondary surveillance radar system in which a means for establishing a dynamic mode declaration criteria calculates with respect to a plurality of target mode blocks an average number of correlations per interrogations expressed as an average percentage.

DESCRIPTION OF THE PREFERRED EMBODIMENTS

Figure 1:
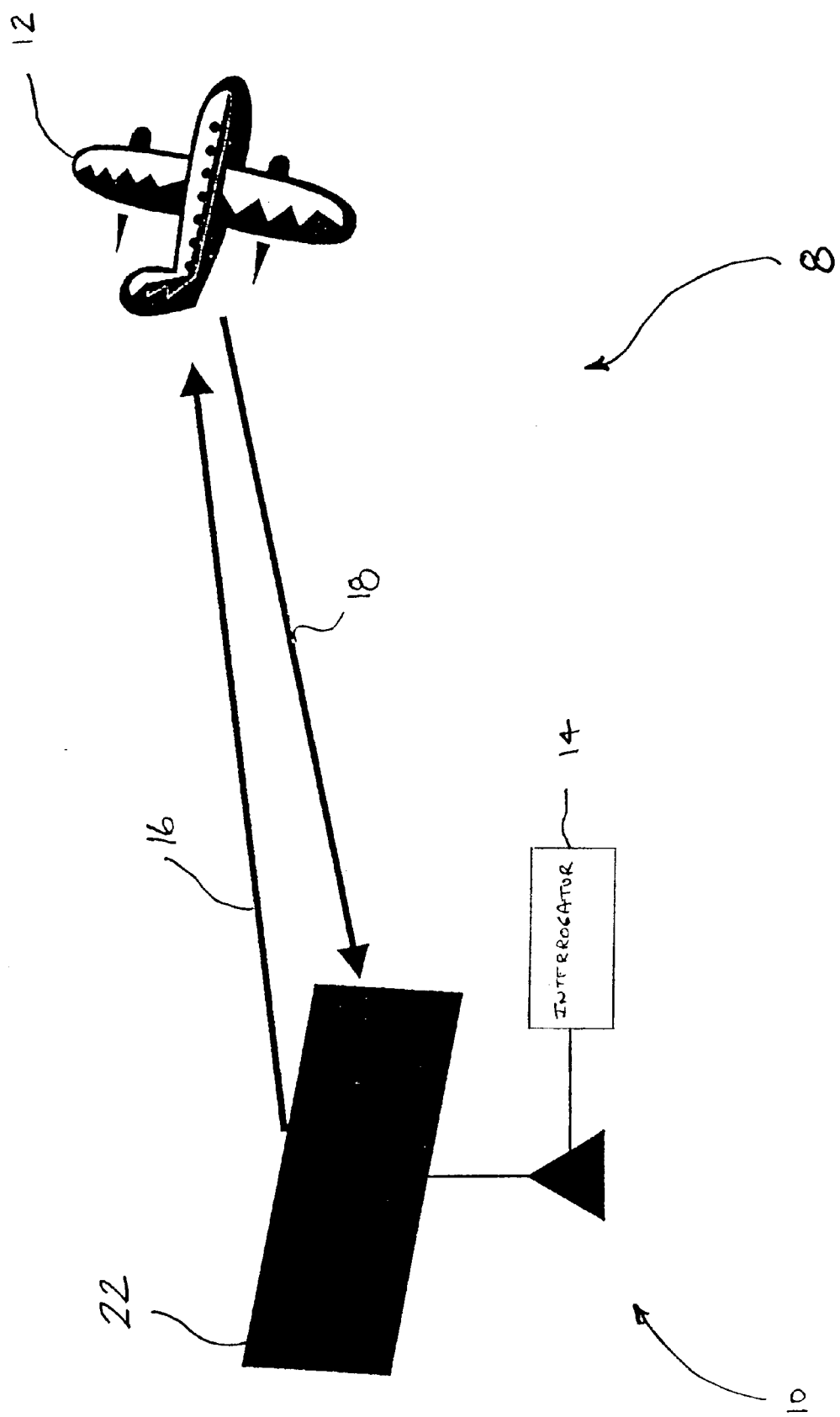
FIG. 1 is a representation of a Secondary Surveillance Radar system in accordance with the present invention in communication with an aircraft.

The present invention will now be described in detail with reference to the drawings. In the drawings, like reference numerals are used to refer to like elements throughout.

FIG. 1 represents the communication from a Secondary Surveillance Radar system (SSR) 8 in accordance with the present invention. The SSR 8 includes an interrogator system 10 and a transponder (not illustrated) located on a platform, such as aircraft 12. The interrogator 14 of the system 10 sends an interrogation signal 16 to the transponder. The transponder receives the interrogation signal 16, performs appropriate processing of the interrogation signal 16 and sends a reply signal 18 to the interrogator system 10, which receives and processes the reply signal 18.

Figure 2:
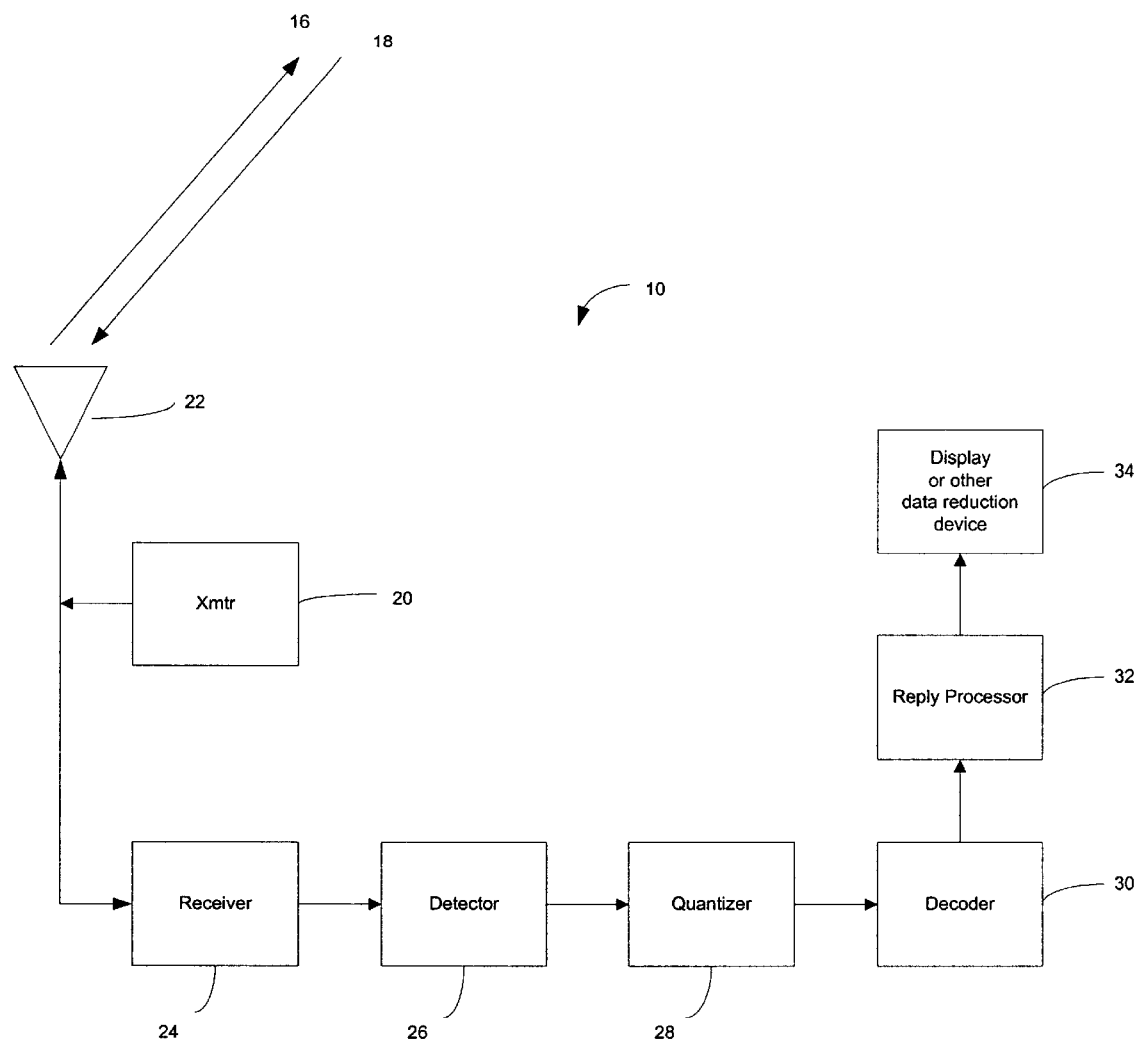
FIG. 2 is a simplified block diagram of an implementation of a Secondary Surveillance Radar interrogator system in accordance with the present invention.

Referring now to FIG. 2, the general operation of the interrogator system 10 will be described in more detail. The interrogation signal 16 is sent by a transmitter 20 through antenna 22. The interrogation signal 16 is received by the transponder located on the aircraft 12. The transponder interprets the interrogation signal 16 and formulates a pulse coded reply signal 18 that contains the information the interrogator portion 14 of the SSR 10 requested.

The reply signal 18 is received by the interrogator 14 through antenna 22, receiver 24, and detector 26. The reply signal is then provided to a quantizer 28, which in turn provides the reply signal 18 to a decoder 30. The decoder 30 interprets the reply signal 18, and then provides an output to a reply processor 32, which extracts the information therefrom. The reply processor 32 then provides an output, generally in the form of a target report, to a display 34 or other data reduction device.

The interrogation signal 16 follows a prescribed and recognized format. In one typical recognized format, the interrogation signal 16 includes two interrogation pulses separated from one another by a defined period of time. For example, if interrogating in modes 1, 2, 3/A, and C, the interrogation signal 16 has two interrogation pulses, identified as P1 and P3 to identify the interrogation mode, as well as a P2 pulse which is used for Interrogator Side Lobe Suppression (ISLS) purposes. In other modes, e.g. modes 4, S, and 5, the interrogation signal would be made up of different interrogation and ISLS formats. The "message," i.e., the particular information being requested, is indicated by the relationship or timing between the interrogation pulses that are present at particular intervals. For clarification purposes, it should be noted that the interrogation signal does not always contain what might conventionally be characterized as a "message." For example, if interrogating in Modes 1, 2, 3/A, and C, the "message" is simply the statement of what the Mode is for which a reply is desired, which is "communicated" by means of the separation time between the P1 and P3 pulses referenced above. Thus, for Modes 1, 2, 3/A and C there is a single reply type for each of the modes. Alternatively, if interrogating in mode 4, the interrogations would include 4 preamble pulses, P1, P2, P3, P4, an ISLS pulse, P5, which is then followed by a series of pulses containing cryptographically encoded information related to the Mode 4 reply.

As is evident from the discussion above, the format of the pulses is generally indicative of the mode of interrogation. The mode indicates to the transponder the information the interrogator 14 is requesting. For example, in the case of an interrogator 14 that is interrogating commercial aircraft, the interrogator 14 may send interrogation signals 16 in modes 3/A or C. If the transponder receives an interrogation signal 16 in mode C, then the processing electronics of the transponder will recognize that this mode is requesting altitude information and will return a reply code indicative of valid altitude, invalid altitude or non-altimeter equipped.

The antenna 22 generally sweeps or scans its field of view. The antenna 22 may be either mechanically or electrically scanned, and in some applications may be statically positioned for a short period of time to a specified position. However, regardless of the method, during any given scan, the interrogator 14 may transmit interrogation signals 16 having different modes. The number of modes that may be transmitted in any given interrogation scan is generally limited by the antenna rotational rate and bandwidth of the antenna beam.

Figure 3:
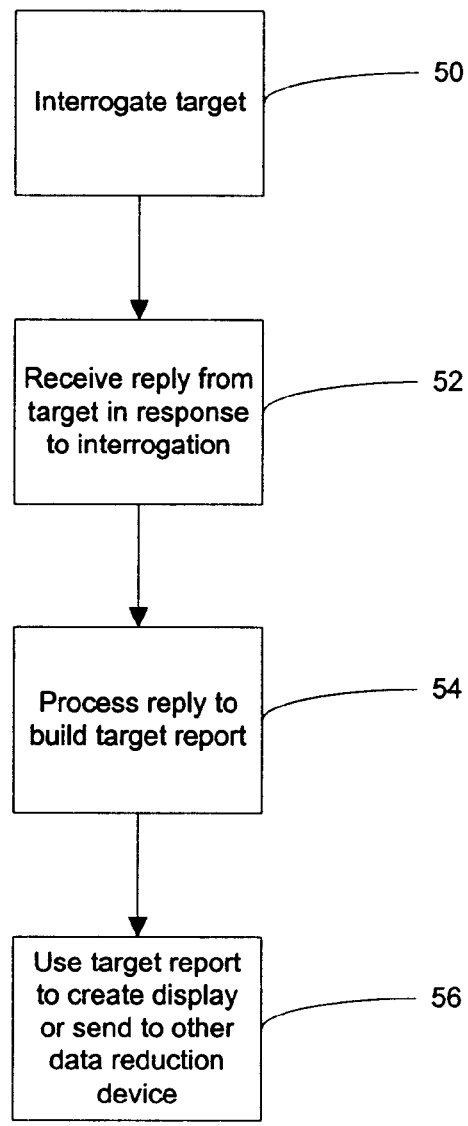
FIG. 3 is a flow chart illustrating the steps of operation employed by a Secondary Surveillance Radar system in accordance with the present invention.

Turning now to FIG. 3, the basic operation of the SSR 8 will be described. As indicated in step 50, the interrogator 14 interrogates the target (e.g., aircraft 12) by sending an interrogation signal 16 and looking for a reply signal 18. In step 52 the interrogator receives the reply signal 18 and then processes the reply signal 18 so as to extract the requested information necessary to build a target report (see step 54). In step 54, the interrogator 14 builds target reports utilizing the information extracted from the reply signal 18. These target reports are then provided in step 56 to a tracker, display or other data reduction device for applicable use. In the case of a display, the target reports will be used to provide a visual indication to a user of the location of targets within the field of view of the SSR 8. In certain instances, all target reports provided the display may not be used for providing a visual indication since the display unit may have internal constraints governing the data to be displayed. For example, the display may limit the range for data to be displayed or may require that certain mode criteria be met in order to display the corresponding data.

Figure 4:
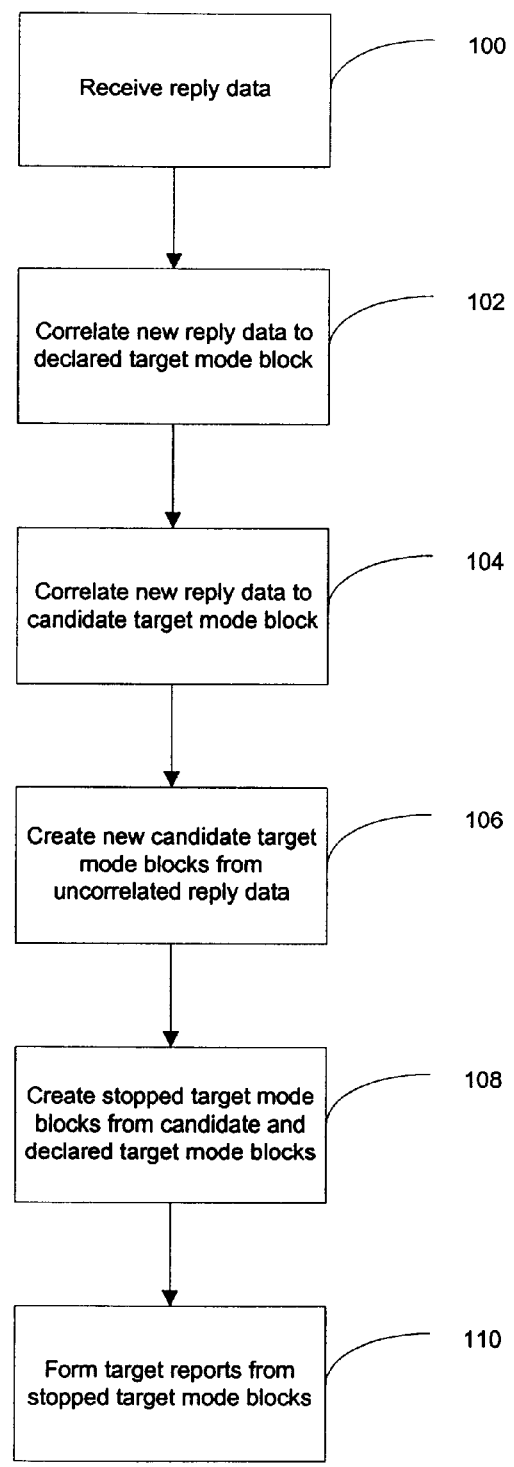
FIG. 4 is a flow chart illustrating in more detail the processing steps a Secondary Surveillance Radar system in accordance with the present invention performs to create target reports.

Referring now to FIG. 4, the processing steps used to create or build the target reports is described in more detail. As is indicated in step 100, the interrogator 14 receives the reply data or signal 18. The reply signal is decoded and then provided to the reply processor 32 for further processing. Specifically, the reply processor begins by correlating the data extracted from the reply signal 18 to Declared Target Mode Blocks (see step 102), which represent a single mode with respect to a single target. Declared Target Mode Blocks are the groups of data representative of the single target, such as aircraft 12, to which the SSR 8 has ascribed a high level of confidence due at least in part to the repetitive nature in which the data has been received. In other words, data sets are flagged by the reply processor 32 of the SSR 8 in those instances where the reply processor 32 has received the same data or substantially similar data a number of times exceeding a predefined threshold. The details of this thresholding will be more fully described below.

After the reply processor has correlated the data from the reply signal 18 to the Declared Target Blocks, it next correlates the remaining data (i.e., the data extracted from the reply signal 18 that has not been correlated to one or more Declared Target Blocks) to Candidate Target Mode Blocks in step 104. Candidate Target Mode Blocks can be defined as the data sets representative of a target that have been previously received but have not yet been exactly or substantially repeated a sufficient number of times to exceed that predefined threshold at which the reply processor 32 will flag the data set as a Declared Target Mode Block. It is important to note that for the sake of simplicity, the above discussion has characterized the reply signal 18 as a single reply from a single target. It should be understood, however, that the reply signal 18 is in fact multiple replies with each reply coming from a different target. Therefore, throughout this discussion, references to a reply will refer to a single reply from a single target and will not refer to the amalgamation of replies resulting from a single interrogation that make up the reply signal 18.

After the reply processor 32 has completed correlation of the reply data to the Candidate Target Mode Blocks, any data remaining that has neither been correlated to a Declared Target Mode Block nor a Candidate Target Mode Block is flagged by the reply processor 32 as a new Candidate Target Mode Block (see step 106).

Moving to step 108, the reply processor 32 now compares all Declared Target Mode Blocks and Candidate Target Mode Blocks against their respective stop criteria. The stop criteria is applied in order to enable the reply processor 32 to determine which of the Declared Target Mode Blocks should be used to form or build the target reports as is indicated in step 110 and which of the Candidate Target Mode Blocks should be discarded. The operational detail of the comparison to the stop criteria will be discussed in more detail below.

Figure 5:
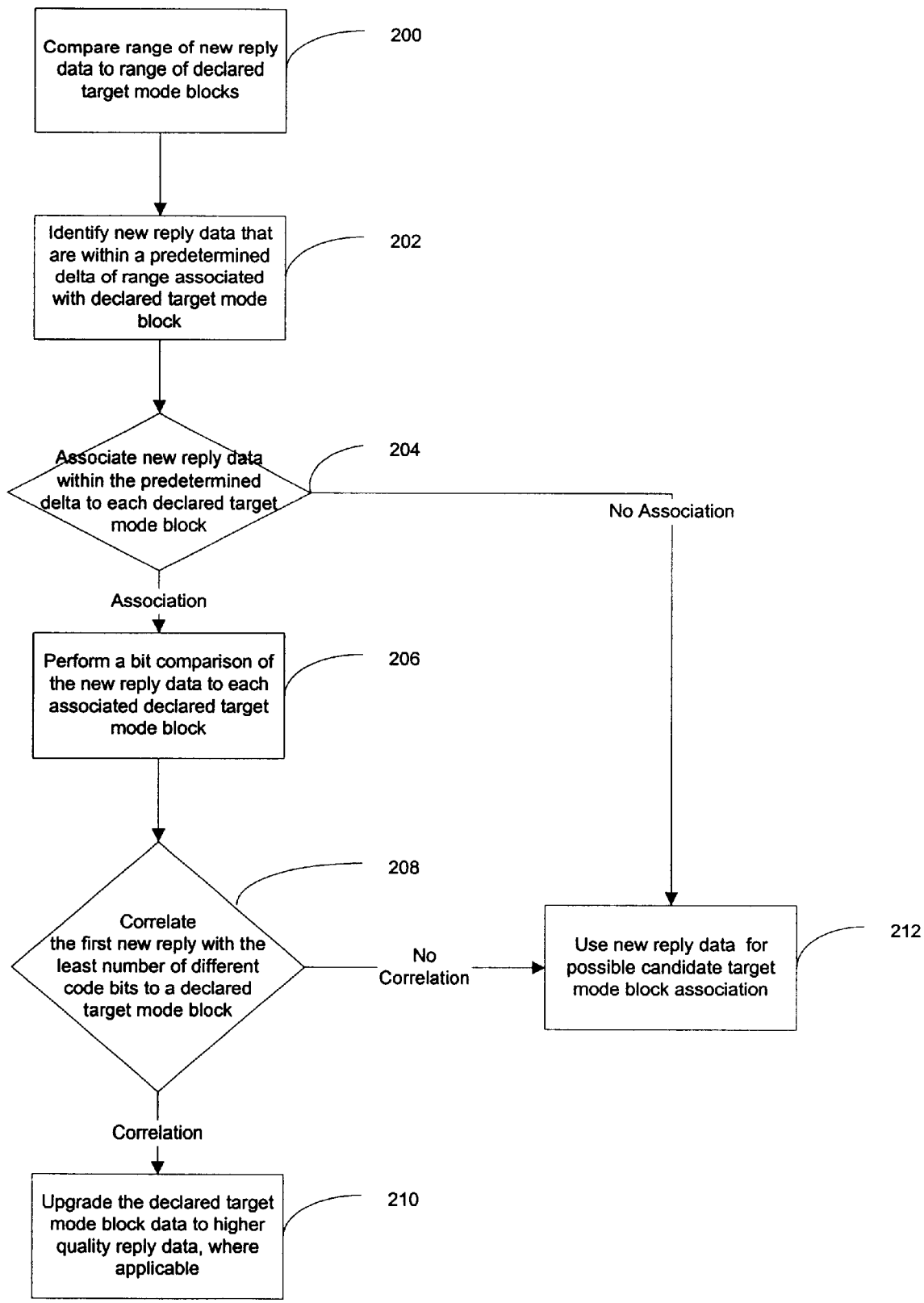
FIG. 5 is a flow chart illustrating in more detail the steps a Secondary Surveillance Radar system in accordance with the present invention performs to correlate new reply data to one or more Declared Target Mode Blocks.

Turning to FIG. 5, the details associated with the correlation of the data extracted from the reply signal 18 to the Declared Target Mode Blocks will be discussed. The reply processor 32 is performing a comparison of the range of the new reply data to the range of the Declared Target Mode Blocks as well as a bit comparison between the code data of the two in order to make the correlation decision. In step 200, the reply processor 32 compares the range of each received reply signal 18 with the range of the Declared Target Mode Blocks. Then, in steps 202 and 204, the reply processor 32 identifies and associates each Declared Target Mode Block to those received reply signals 18 that are within a predetermined delta of its range. It should be noted that a Declared Target Mode Block may be associated with multiple reply signals that fall within the aforementioned predetermined delta. It should be further noted, that if a particular reply signal 18 is not associated to at least one Declared Target Mode Block, it will be passed to the next stage of processing for comparison to the Candidate Target Mode Blocks.

At this point, as is indicated in step 206, the reply processor 32 performs a bit comparison between the Declared Target Mode Blocks and their associated reply signals. In contrast to prior implementations of this correlation step, the present invention permits the Declared Target Mode Blocks to select the best match from the associated reply signals, as opposed to the reply signals selecting an associated Declared Target Mode Block. In this manner, as is indicated in step 208, the Declared Target Mode Block will select the associated reply signal 18 having the least number of different code bits for the code data. Upon completion of the correlation in step 208, the reply processor then updates the location in a memory array associated with that particular Declared Target Mode Block regarding the new reply correlation. If the new reply signal data is of higher quality than that previously stored in the associated location of the memory array, then the data at that location is replaced with the data contained in the new reply signal 18 (see step 210). Again, as with reply signals 18 that do not correlate in range with any Declared Target Mode Blocks, if any reply signals fail to be correlated to a Declared Target Mode Block after the reply processor 32 has performed the code data bit comparison, then such reply signals 18 will be passed to and used in the correlation to the Candidate Target Mode Blocks that will be described more fully below (see step 212).

Figure 6:
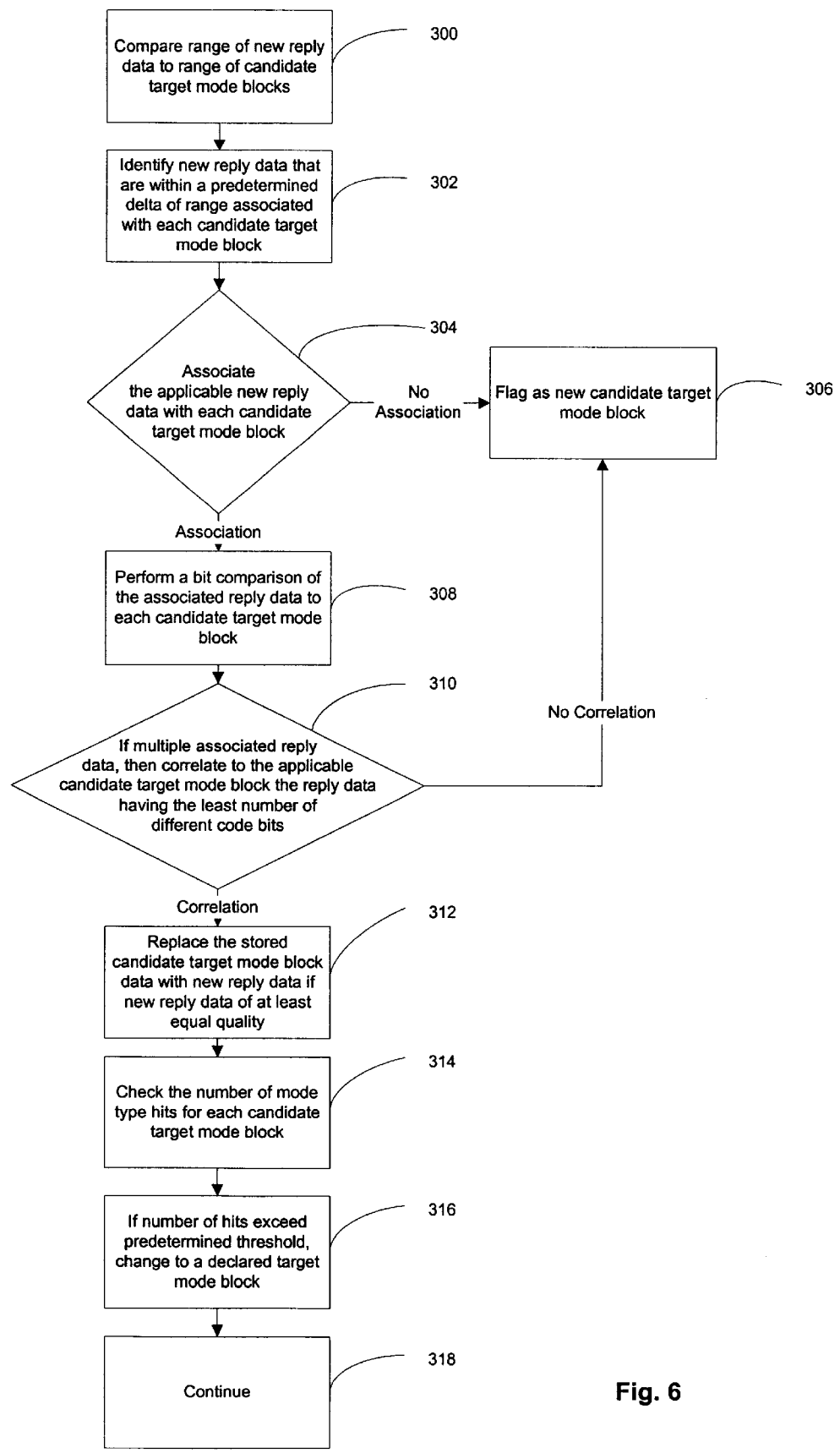
FIG. 6 is a flow chart illustrating in more detail the steps a Secondary Surveillance Radar system in accordance with the present invention performs to correlate new reply data to one or more Candidate Target Mode Blocks.

Turning to FIG. 6, the details associated with the correlation of the data extracted from the reply signal 18 to the Candidate Target Mode Blocks will be discussed. As with the comparison to the Declared Target Mode Blocks, the reply processor 32 performs a comparison of the range of the new reply data to the range of the Candidate Target Mode Blocks as well as a bit comparison between the code data of the two in order to make the correlation. However, in this portion of the process, the predetermined range delta will typically, but not necessarily, be smaller than the predetermined range delta for the comparison to the Declared Target Mode Blocks, as slightly less tolerance is necessary for this step. As is indicated in step 300, the reply processor 32 compares the range of each received reply signal 18 with the range of the Candidate Target Mode Blocks. Then, in steps 302 and 304, the reply processor 32 identifies and associates each Candidate Target Mode Block to those received reply signals 18 that are within the predetermined delta of the range of each Candidate Target Mode Block. As was the case with the Declared Target Mode Blocks, each Candidate Target Mode Block may be associated with multiple reply signals that fall within the aforementioned predetermined delta. Furthermore, as indicated in step 306, if a particular reply signal 18 is not associated to at least one Candidate Target Mode Block, then it will be flagged by the reply processor 32 to start a new Candidate Target Mode Block.

At this point, as is indicated in step 308, the reply processor 32 performs a code data bit comparison between the Candidate Target Mode Blocks and their associated reply signals. As with the Declared Target Mode Blocks, the present invention permits the Candidate Target Mode Blocks to select the best match from the associated reply signals, as opposed to the reply signals selecting an associated Candidate Target Mode Block. In this manner, the Candidate Target Mode Block will select the associated reply signal 18 having the least number of different code bits (see step 310). Upon completion of the correlation in step 310, the reply processor then updates the location in a memory array associated with that particular Candidate Target Mode Block regarding the new reply correlation. If the new reply signal data is of higher quality than the data previously stored at that location in the memory array, then the data at that location is replaced with the data contained in the new reply signal 18 (see step 312). Again, as with reply signals 18 that do not correlate in range with any Candidate Target Mode Blocks, if any reply signals fail to be correlated to a Candidate Target Mode Block after the reply processor 32 has performed the code data bit comparison, then such reply signals 18 will be flagged by the reply processor 32 as new Candidate Target Mode Blocks (see step 306).

Unlike the Declared Target Mode Blocks, additional processing of the Candidate Target Mode Blocks is required at this point in order to determine whether or not specific Candidate Target Mode Blocks should be upgraded to Declared Target Mode Blocks. As is indicated in step 314, the reply processor checks the number of hits (i.e., match or substantial match) correlated with each Candidate Target Mode Block. If the number of hits exceeds a predetermined threshold, then in step 316, the reply processor 32 upgrades the applicable Candidate Target Mode Block to a Declared Target Mode Block. At this point, the reply processor 32 then continues processing the Candidate Target Mode Blocks and Declared Target Mode Blocks (see step 318).

Figure 7:
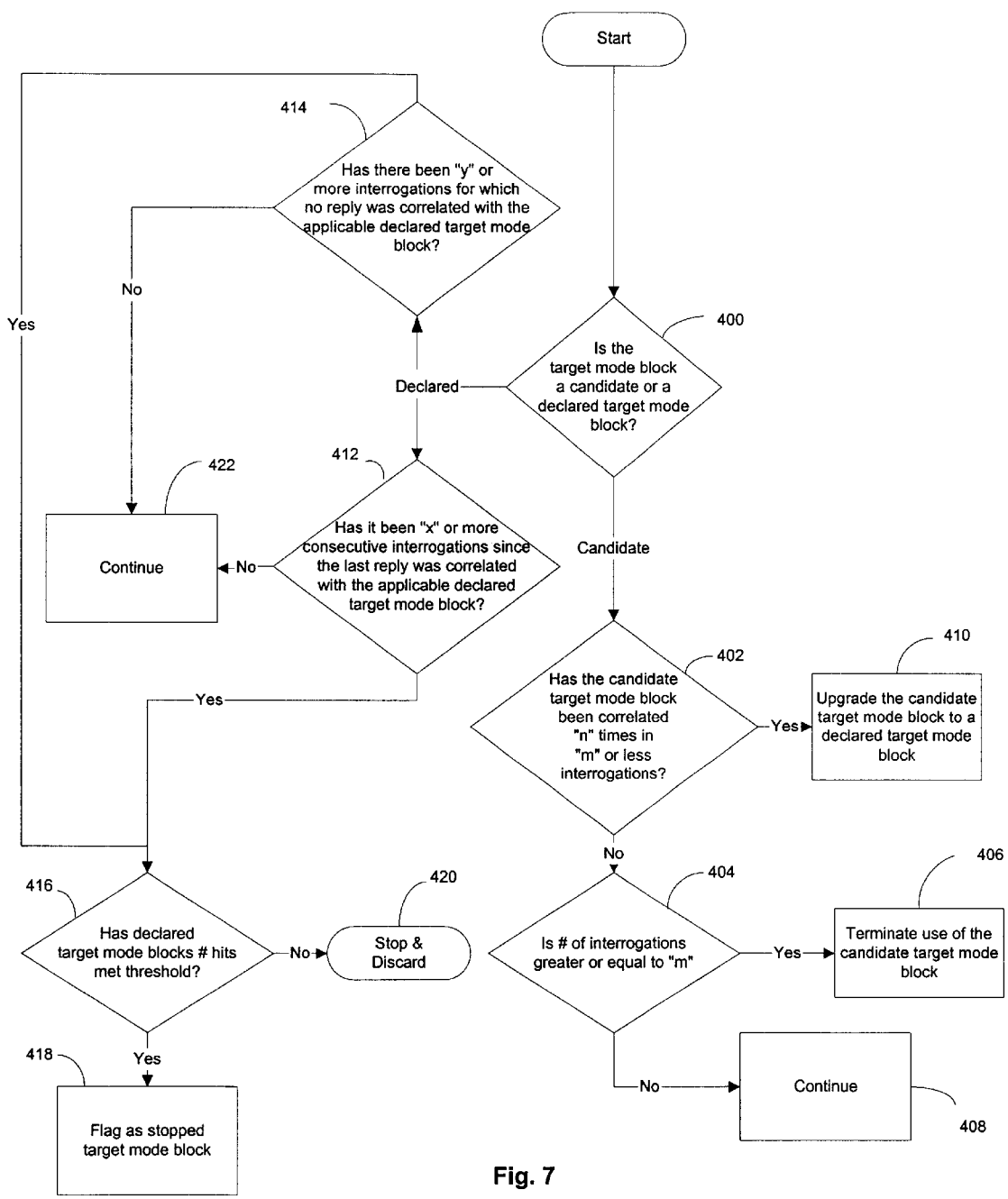
FIG. 7 is a flow chart illustrating in more detail the steps a Secondary Surveillance Radar system in accordance with the present invention performs to determine whether the Declared Target Mode Blocks and the Candidate Target Mode Blocks have met their respective stop criteria.

Turning now to FIG. 7, the reply processor 32 must now determine which of the Declared Target Mode Blocks are to be used to build the target reports and which of the Candidate Target Mode Blocks are to be discarded. Specifically, the reply processor 32 is determining which of the Declared Target Mode Blocks and which of the Candidate Target Mode Blocks have met their respective stop criteria.

Discussing the Candidate Target Mode Blocks first, in step 400, the reply processor 32 checks to see whether or not a particular Target Mode Block is a Candidate or a Target Mode Block. If it is a Candidate Target Mode Block, the reply processor determines whether or not the Candidate Target Mode Block has been correlated "n" times in "m" or less interrogations (see step 402). If the Candidate Target Mode Block has not been correlated "n" times in "m" or less interrogations of the same mode, then, in step 404, the reply processor 32 determines whether or not "m" interrogations have occurred. If so, the reply processor terminates further use of this Candidate Target Mode Block and discards the same from memory (see step 406). If not, the Candidate Target Mode Block remains for further processing (see step 408).

If, however, the Candidate Target Mode Block satisfies this criteria, then as was discussed previously, the Candidate Target Mode Block is upgraded to a Declared Target Mode Block (see step 410). In this embodiment of the present invention, although looking for "m" interrogations in the same mode, in a multi-mode interrogation scheme, the reply processor is assuming equal interrogations for each enabled mode and is therefore setting the interrogation limit at a number other than "m." Specifically, the stop criteria for this embodiment is based simply on the number of interrogations since the reply signal 18 that created the Candidate Target Mode Block, with the interrogation limit for the stop criteria being "m" (a predetermined value) times the number of modes being interrogated minus one; the minus one accounting for the first interrogation that created the Candidate Target Mode Block.

The stop criteria for Declared Target Mode Blocks may be based upon a predetermined number of consecutive interrogations since the last reply was correlated to the particular Declared Target Mode Block (see step 412). Alternatively, the stop criteria may be based upon a predetermined number of total interrogations (i.e. non-consecutive as opposed to consecutive interrogations) for which no reply was correlated to the particular Declared Target Mode Block (see step 414). After a Declared Target Mode Block has satisfied the Stop Criteria, the reply processor applies a dynamic thresholding requirement in step 416. The details of the dynamic thresholding will be described in detail below. If the Declared Target Mode Block satisfies the requirement in step 416, then the Declared Target Mode Block is flagged as a Stopped Target Mode Block (see step 418). If the Declared Target Mode Block does not satisfy the requirement of step 416, then the Declared Target Mode Block is discarded (see step 420). As is indicated in step 422, if the Declared Target Mode Block does not satisfy the stop criteria in steps 412 or 414, then the Declared Target Mode Block is retained for the processing of Declared Target Mode Blocks described above (see step 422).

In order to improve further the reliability of the Stopped Target Mode Blocks that are used to build the target reports, the present invention has built in a dynamic thresholding requirement (see step 416). Specifically, in order to be flagged as a Stopped Target Mode Block and hence used to build a target report, each Declared Target Mode Blocks must meet or exceed a total hits threshold. The total hits threshold is calculated as a predetermined constant, which in the present embodiment is 0.60, times the mean for hits per mode. The mean for hits per mode is a running average of the number of hits for the Stopped Target Mode Blocks that have previously met the total hits threshold. In the present embodiment, the mean for hits per mode are based on the running average of the last 128 Stopped Target Mode Block hits per mode values, which exceed the threshold. However, a greater or lesser number of values could be used without departing from the scope of the present invention. For example, if the prior 128 Stopped Target Mode Blocks averaged 10 correlated replies or hits, then in order for a new Stopped Target Mode Block to be used to build a target report, it must have had at least six correlated replies (i.e., 10×0.60). If it does not have the requisite number of correlated replies, the Stopped Target Mode Block will be discarded as it is likely one of a False Reply Unsynchronized in Time (FRUIT), of poor quality due to interference, and/or multiple path replies. If the Stopped Target Mode Block does have the requisite number of correlated replies, then the reply processor 32 will set a status flag equal to a predefined number indicative of the availability of that Stopped Target Mode Block for target report generation.

The target report will be built using the Stopped Target Mode Blocks. However, since correlations can occur even when the code bits are not identical but only substantially identical, prior to using the Stopped Target Mode Block for creation of the target report, the reply processor 32 must determine what code bits will be used to represent the Stopped Target Mode Block. In this embodiment of the present invention, the reply processor will use "bit voting" to set the code bits. Specifically, the reply processor 32 will check each bit and will set the bit to "1" if the number of times the bit was "1" as a percentage of the total number of hits for that particular Declared Target Mode Block exceeds a predetermined threshold. For example, if the Declared Target Mode Block had 10 correlated replies or hits and the first code bit was a "1" in seven of those replies, then for that particular bit, the bit was "1" seventy percent of the time. If seventy percent exceeds the established threshold, then bit 1 will be set to "1" in the Stopped Target Mode Block. In this embodiment of the present invention, the threshold has been set at fifty-five percent. As an alternative to "bit voting," if interrogating in Mode C, the reply processor may convert the reply, which is in Gillham Code, to altitude, and average the altitudes, which are closely related, thereby ignoring the large altitude jumps which are related to an incorrect Gillham Code.

Interrogation Mode C poses certain issues for the reply processor 32 due to the dynamic nature of mode C replies. Specifically, a Mode C reply can be one of three types: Valid Altitude, Invalid Altitude, and Non-equipped Altimeter. Therefore, in addition to performing the checks discussed above for Mode C replies, the present invention also checks and maintains the correct mode C type during the determination of the Mode C reply that is to be used for target report generation.

Figure 8:
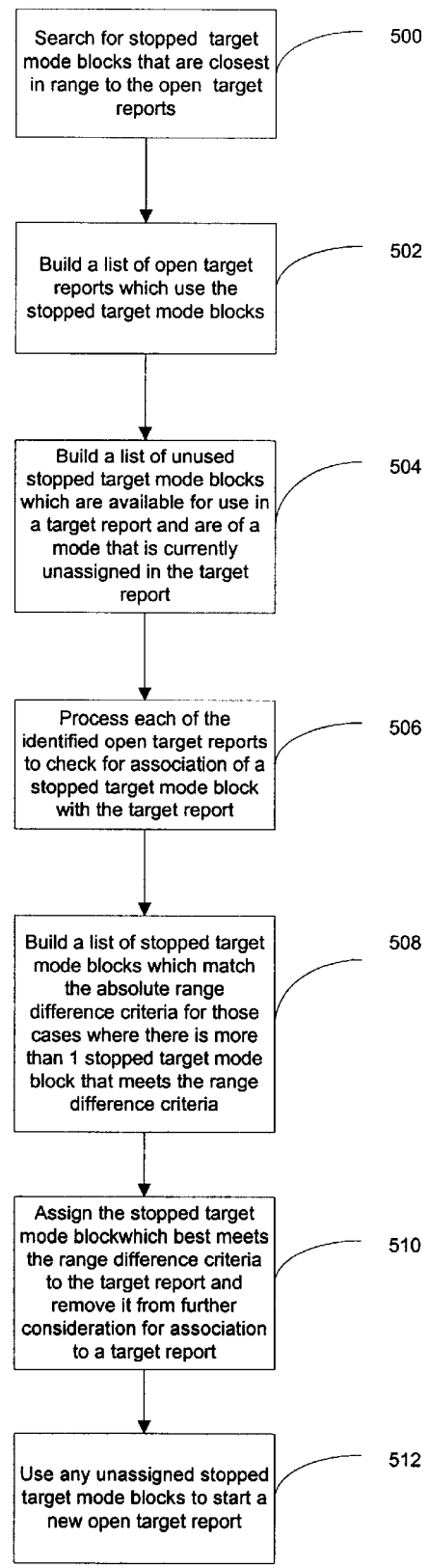
FIG. 8 is a flow chart illustrating in more detail the steps a Secondary Surveillance Radar system in accordance with the present invention performs to create target reports from the Declared Target Mode Blocks that have met their stop criteria.

Referring now to FIG. 8, the generation of the target reports will be described in more detail. Generally, the Stopped Target Mode Blocks are processed into target reports in much the same way as the reply signals are processed into the Target Mode Blocks, except that there is only a single category of target reports as opposed to the dual categories (Candidate and Declared) of Target Mode Blocks.

As is indicated in steps 500 and 502, the reply processor searches for Stopped Target Mode Blocks that are close in range to open target reports, and builds a list of open target reports based upon these search results. As is indicated in step 504, from the list of open target reports that use Stopped Target Mode Blocks, the reply processor 32 creates a list of unused Stopped Target Mode Blocks that have a mode that is currently unassigned in one or more of the open target reports. The reply processor processes each open target report and associates one or more unused Stopped Target Mode Blocks thereto (see step 506). At this stage, if an open target report can be associated with more than one unused Stopped Target Mode Blocks, then the reply processor will correlate the open target report to the unused Stopped Target Mode Block having the smallest range delta with said target report (see steps 508 and 510). On the other hand, if an open target report is associated with only one unused Stopped Target Mode Block, then the reply processor will correlate accordingly. After a Stopped Target Mode Block has been correlated to an open target report, the reply processor flags the Stopped Target Mode Block as used so as to remove it from potential association to another target report (see step 510).

If a Stopped Target Mode Block is not associated with an open target report, the reply processor uses it to start a new open target report (step 512). This newly created open target report is then looped back for immediate comparison to the remaining unused Stopped Target Mode Blocks.

The final stage of processing results in output of a closed target report. In this case the stop criteria for closing an open target report is relatively straightforward. First, if the number of modes included within a target report is equal to the number of modes being interrogated, then the target report is closed and output to the display or other data reduction device. If, however, all modes within a target report are not filled, but the age of the open target report exceeds a predetermined interrogation count, then the report is also closed and output to the display or other data reduction device. In the present embodiment of this invention, the age is computed as the difference between the interrogation count when the new open target report was formed and the current interrogation count.

Although the invention has been shown and described with respect to certain embodiments, it is obvious that equivalents and modifications will occur to others skilled in the art upon the reading and understanding of the specification.

What is claimed is:

1. A method of processing reply signals received in response to an interrogation by a secondary surveillance radar system comprising the steps of:
   (a) receiving a reply signal from each of a plurality of targets;
   (b) enabling each of a plurality of existing target mode blocks having a predefined mode to select from the reply signals; and
   (c) correlating the selected reply signal to the target mode block that selected same.

2. A method according to claim 1, wherein the step of enabling includes the steps of comparing a range of the reply signal to a range of each of the target mode blocks and associating each existing target mode block to each of the plurality of reply signals that is within a predetermined range delta.

3. A method according to claim 2, wherein the step of correlating further includes the steps of comparing data bits between a particular target mode block and each of the reply signals associated thereto and correlating to the particular target mode block the reply signal having the least number of different data bits.

4. A method according to claim 1, wherein the target mode blocks are one of a candidate target mode block or a declared target mode block.

5. A method according to claim 4, further comprising the step of upgrading a candidate target mode block to a declared target mode block when the number of times the candidate mode block has been correlated exceeds a predetermined threshold.

6. A method according to claim 5, further comprising the step of selecting the declared target mode blocks available for association with one of a plurality of existing target reports.

7. A method according to claim 6, wherein the step of selecting includes determining the declared target mode blocks having a reply signal correlated thereto within a predetermined number of interrogations.

8. A method according to claim 6, wherein the step of selecting includes determining the declared target mode blocks having a reply signal correlated thereto within a predetermined number of consecutive interrogations.

9. A method according to claim 6, further comprising the steps of comparing the selected declared target mode blocks to a dynamic threshold and listing selected declared target mode blocks that exceed the dynamic threshold.

10. A method according to claim 9, wherein the dynamic threshold is calculated by multiplying a predetermined constant and an average number of times a predetermined number of previously listed selected target mode blocks were correlated.

11. A method according to claim 9, further comprising the step of associating one of the listed declared target mode blocks with one of the existing target reports.

12. A method according to claim 11, wherein the step of associating includes the step of assigning to the one of the existing target reports the selected declared target mode block that satisfies a predetermined range difference criteria.

13. A method according to claim 11, further comprising the step of creating a new target report from any listed declared target mode blocks unassigned to one of the existing target reports.

14. A method according to claim 1, wherein the mode is one of a group consisting of mode 1, mode 2, mode 3/A, mode C, mode 4, mode S, and mode 5.

15. A method of processing reply signals received in response to an interrogation by a secondary surveillance radar system comprising the steps of:

(a) receiving a reply signal from each of a plurality of targets;

(b) correlating the reply signals to one of a plurality of existing target mode blocks;

(c) selecting the existing target mode blocks that satisfy a predetermined mode declaration criteria;

(d) identifying the existing target mode blocks selected in step (c) to be used to build a plurality of target reports.

16. A method according to claim 15, wherein the step of identifying includes calculating a dynamic threshold by multiplying a predetermined constant and an average number of times a predetermined number of prior identified existing mode blocks had reply signals correlated thereto.

17. A method according to claim 15, wherein the step of selecting includes determining the existing target mode blocks having a reply signal correlated thereto within a predetermined number of interrogations.

18. A method according to claim 15, wherein the step of selecting includes determining the existing target mode blocks having a reply signal correlated thereto within a predetermined number of consecutive interrogations.

19. A secondary surveillance radar system for sending a plurality of interrogations and receiving a plurality of reply signals in response thereto comprising:

(a) a transmitter for sending the interrogations;

(b) a receiver for receiving the reply signals, the receiver having an output;

(c) a processor operatively coupled to the output for processing the reply signals, the processor including:

(1) a memory for storing a plurality of existing target mode blocks;

(2) a first correlator for selectively correlating the reply signals to one of the plurality of existing target mode blocks;

(3) a means for establishing a dynamic predetermined mode declaration criteria; and (4) a second correlator for selectively correlating the target mode blocks that satisfy the predetermined mode declaration criteria to one of a plurality of existing target reports.

20. A secondary surveillance radar system in accordance with claim 19, wherein the means for establishing calculates with respect to the target mode blocks an average number of correlations per interrogations expressed as an average percentage.

21. A secondary surveillance radar system in accordance with claim 20, wherein the second correlator correlates only the target mode blocks that have a percentage of correlations per interrogations exceeding the average percentage.

* * * * *